US012761364B2

(12) United States Patent
Tsadka et al.

(10) Patent No.: US 12,761,364 B2
(45) Date of Patent: Oct. 13, 2026

(54) LIDAR WITH COMBINED FAST/SLOW SCANNING

(71) Applicant: Makalu Optics Ltd., Yokneam Ilit (IL)

(72) Inventors: Sagie Tsadka, Yokneam Ilit (IL); Shai Agassi, Yokneam Ilit (IL)

(73) Assignee: MAKALU OPTICS LTD., Yokneam Illit (IL)

( * ) Notice: Subject to any disclaimer, the term of this patent is extended or adjusted under 35 U.S.C. 154(b) by 1450 days.

(21) Appl. No.: 17/331,265

(22) Filed: May 26, 2021

(65) Prior Publication Data

US 2022/0381919 A1 Dec. 1, 2022

(51) Int. Cl.

| | |
|---|---|
| ***G01S 17/931*** | (2020.01) |
| ***G01S 7/481*** | (2006.01) |
| ***G01S 7/484*** | (2006.01) |
| ***G01S 7/486*** | (2020.01) |

(52) U.S. Cl.

CPC .......... *G01S 17/931* (2020.01); *G01S 7/4817* (2013.01); *G01S 7/484* (2013.01); *G01S 7/486* (2013.01)

(58) Field of Classification Search

None

See application file for complete search history.

(56) References Cited

U.S. PATENT DOCUMENTS

| | | | | |
|---|---|---|---|---|
| 2010/0066995 A1* | 3/2010 | Rindle | .................... G01S 17/18 356/5.03 | |
| 2021/0011138 A1 | 1/2021 | Pan et al. | | |

FOREIGN PATENT DOCUMENTS

| | | | | |
|---|---|---|---|---|
| JP | 2020517912 A | 6/2020 | | |
| WO | 2018/200754 A1 | 11/2018 | | |
| WO | WO-2020234797 A1 * | 11/2020 | ........... | G01S 17/933 |

OTHER PUBLICATIONS

International Preliminary Report on Patentability dated Nov. 21, 2023 for related PCT Application No. PCT/IB2022/054861; 17 Pages.

International Search Report and Written Opinion dated Sep. 30, 2022 for related PCT Application No. PCT/IB2022/054861; 25 Pages.

Japanese Office Action dated Mar. 8, 2026 for Japanese Application No. 2023-572859; 5 Pages.

* cited by examiner

*Primary Examiner* — Luke D Ratcliffe

(74) *Attorney, Agent, or Firm* — Brooks Kushman P.C.

(57) ABSTRACT

Three-dimensional LiDAR scanning combines a solid-state fast scanning device such as an optical switch and a slower scanning device such as a mirror and may include a switch architecture for a large port-count optical switch to provide frame rates of 100 Hz or higher with improved resolution and detection range. A controller provides adjustable scanning of the field-of-view (FOV) with respect to scan area, scan or frame rate, and resolution for a frame, detected object, or time slices of a scan. A controller combines RGB data with NIR data to match 3D images with color 2D images. A controller or computer processes point cloud data to generate vector cloud data to identify, categorize, and track objects within or beyond the FOV. Vector cloud data provides lossless compression for storage/communication of road traffic and scene data, object history, and object sharing beyond the FOV.

62 Claims, 6 Drawing Sheets

LIDAR WITH COMBINED FAST/SLOW SCANNING

TECHNICAL FIELD

This disclosure relates to scanning LiDAR and a method that combine solid-state and mechanical scanning.

BACKGROUND

LiDAR is an active remote sensing technology that uses light from a transmitter reflected by objects within a field of view (FOV) to determine the range or distance to the objects. This information can be processed to generate an image or otherwise used for mapping, object identification, object avoidance, navigation, etc. in various types of vehicles, such as automotive vehicles or drones, for example. While a number of LiDAR solutions have been proposed and may be acceptable for particular applications, various strategies have associated disadvantages that may make them unsuitable in other applications. Various types of actuators or devices may be used to scan a laser beam across the FOV. When scanning an FOV using two mechanical mirrors, one of the mirrors typically operates with extreme speed and accuracy to be able to cover the entire FOV several times a second, or more. Such a mirror is expected to perform 100's of billions of cycles or even one trillion cycles a year to support the LiDAR scan pattern at all times. Such a huge number of cycles and fast tuning results in wear and tear over time and will reduce significantly the reliability of the system and limit the frame rate of the image that can be created using this method. To address these problems, scanning LiDAR systems having exclusively solid-state scanning have been developed to eliminate the associated moving parts and improve reliability and robustness. However, associated optical losses in these systems may constrain resolution and detection range, and power requirements may not be suitable for all applications.

SUMMARY

Systems and methods of the present disclosure provide three-dimensional LiDAR scanning through a combination of a solid-state fast scan mechanism and a slower mechanical scan mechanism. The combined solid state and mechanical scanning LiDAR may provide improved resolution and detection range that may be better suited for autonomous vehicle and/or self-driving cars than previously deployed systems. The fast scanning mirror of a mechanical system is replaced with a solid state device, such as a Magneto Optic (MO) switch, to provide a faster scan rate that can support a 100 Hz frame rate or even higher, while providing higher reliability for the whole system since there are no moving parts in the fast switching mechanism.

In one or more embodiments, a scanning LiDAR system comprises a laser, a first optical switch having an input configured to receive laser pulses from the laser and to redirect the laser pulses to a selected one of a plurality of outputs, a first plurality of fibers each coupled to a different one of the plurality of outputs of the first optical switch, a mirror configured to pivot or rotate in response to a control signal, a first at least one optical element configured to receive the laser pulses from the first plurality of fibers and to redirect the laser pulses to the mirror, at least one detector, a second plurality of fibers having inputs configured to receive the laser pulses reflected from a field of view and outputs coupled to the at least one detector, and at least one controller. The at least one controller is configured to control the first optical switch to direct the laser pulses from the input of the first optical switch to each of the plurality of outputs in turn, to generate the control signal to control the mirror to pivot or rotate to direct light from the first plurality of fibers to scan at least a portion of the field of view and direct reflected light from the field of view to the inputs of the second plurality of fibers, and to process signals from the at least one detector to generate data representing the at least a portion of the field of view. The first optical switch may be configured with no moving parts associated with switching light from the input to one of the plurality of outputs, and may be implemented as a magneto-optic switch.

In various embodiments, the system includes at least one optical switch comprising a plurality of layers including at least an input layer with a first switching element and an output layer with a plurality of switching elements, each of the first switching element and the plurality of switching elements being configured to optically switch light in sequence between a single input and a plurality of outputs in response to a control signal from at least one controller, wherein the single input of the first switching element of the input layer comprises the input of the optical switch, and the plurality of outputs of the switching elements of the output layer comprise the outputs of the optical switch, each layer having the single input of each switching element in the layer connected to one of the plurality of outputs of an associated one of the switching elements in an adjacent layer, wherein the at least one controller is configured to operate the first switching element at a first switching speed and to operate the switching elements of each layer at a slower switching speed than the first switching speed. In one or more embodiments, the at least one controller is configured to operate the switching elements of each layer at a switching speed between the first switching speed and an integer multiple of the first switching speed corresponding to an integer number of switching elements in the layer. The first switching element may comprise an electro-optic switch. Each of the plurality of switching elements may comprise a magneto-optic switch. In one or more embodiments, the optical switch may comprise a middle layer between the input layer and the output layer, wherein the input layer comprises a 1×2 electro-optic switch, the middle layer comprises two 1×4 magneto-optic switches, and the output layer comprises eight 1×4 magneto-optic switches to provide a 1×32 switch with the electro-optic switch operating at a higher switching speed than the magneto-optic switches.

In various embodiments, the system may include a Galvanometric mirror, a rotating prism, a MEMS mirror, or a piezoelectric transducer (PZT) mirror. The first plurality of fibers may be arranged in a linear array to scan a pixel column within the field of view with the mirror controlled by the at least one controller to move the pixel column horizontally across the field of view, or the first plurality of fibers may be arranged in a linear array to scan a pixel row within the field of view with the mirror controlled by the at least one controller to move the pixel row vertically across the field of view. The at least one detector may comprise a plurality of detectors each coupled to one of the outputs of the second plurality of fibers. The plurality of detectors may correspond in number to the first plurality of fibers and the second plurality of fibers. In one embodiment, the first at least one optical element forms output beams from the laser pulses having an angular divergence along a first axis that is an integer multiple number of times greater than an angular divergence along a second axis perpendicular to the first axis, and the second plurality of fibers includes the integer multiple times a number of fibers in the first plurality of fibers, and the integer multiple times the number of outputs of the first optical switch. The at least one first optical element may comprise an aspherical lens, an anamorphic prism, or a cylindrical lens configured to form an output beam having an elliptical cross section. The laser may comprise a fiber laser configured to generate pulses having a nominal wavelength between 900 nanometers (nm) and 1700 nanometers (nm). The first at least one optical element may comprise a beam splitter configured to redirect the laser pulses to the mirror and to redirect the reflected light from the field of view to the inputs of the second plurality of fibers. The at least one detector may comprise a first linear detector configured to detect near-infrared (NIR) light and a second linear detector configured to detect visible light, with the system including a dichroic beam splitter configured to receive reflected light from the field of view and to redirect received reflected NIR light from the second plurality of fibers to the first linear detector, and to redirect visible light from the second plurality of fibers to the second linear detector. The at least one controller may include a processor programmed to combine and overlay data from the first and second linear detectors to generate a combined image of the field of view.

In one or more embodiments, the system includes at least one controller configured to control the first optical switch and the mirror in a hybrid scanning mode including a lower resolution that generates a first number of data points per area of the field of view within a first portion of a frame representing the field of view and a higher resolution mode that generates a second number of data points per area of the field of view within a second portion of the frame representing the field of view, wherein the second number of data points is higher than the first number of data points.

Embodiments may include a system with at least one controller configured to control the first optical switch and the mirror in at least a lower resolution first mode that generates a first number of data points within a frame representing the field of view at a first frame rate, and a higher resolution second mode that generates a second number of data points within the frame representing the field of view at a second frame rate, wherein the second number of data points is greater than the first number of data points and the second frame rate is less than the first frame rate. In one embodiment, the first number of data points multiplied by the first frame rate is equal to the second number of data points multiplied by the second frame rate. The at least one controller may be configured to switch between the first and second modes and to combine the data generated by operation in the first and second modes to generate a single frame of the field of view. The at least one controller may be further configured to control the first optical switch and the mirror to scan only a portion of the field of view. The at least one controller may be further configured to process the data to identify an object, wherein the portion of the field of view corresponds to the object. The at least one controller may select one of the first mode and the second mode in response to location of the system, ambient conditions, or identification of an object within the field of view.

In various embodiments, the at least one controller may be configured to process the data generated by repeated scanning of the field of view to generate a point cloud, and to determine a velocity vector including speed and direction for at least some of the point cloud to generate a corresponding vector cloud. The at least one controller may identify an object based on a cluster of vectors within the vector cloud having similar values differing by less than a predetermined tolerance value. The at least one controller may identify a plurality of related objects based on a plurality of vector clusters having similar values and categorize the plurality of objects into one of a plurality of predetermined object types. The at least one controller may be further configured to store or communicate an object type, object position relative to the field of view, and object velocity vector for each of a plurality of objects within the field of view to provide a compressed representation of the field of view. The at least one controller may be configured to communicate the object type, position, and vector to a remotely located computer server. The at least one controller may be further configured to receive a certainty score from the remotely located computer server based on a comparison of the object type, position, and vector to a previously stored object type, position, and vector by the remotely located computer server. The at least one controller may be further configured to receive object-related data previously stored by the remotely located computer server in response to the server identifying the object based on one or more of the communicated object type, position, and vector. The object-related data may comprise object historical data, which may include at least one of a movement timestamp, movement direction, speed, and location relative to the field of view. The at least one controller may be further configured to receive vector data associated with at least one object that is outside the field of view. The at least one controller may be further configured to receive vector data associated with at least one object that is within the field of view and to combine the received vector data with the generated data representing the at least a portion of the field of view.

At least one embodiment may include the ability to separate 3D object representation of the plurality of objects identified in successive scans and the object type, positions and speed vectors over each successive scan. The 3D object representations may collect over time representations and scans of the same object as viewed from different angles, since the LiDAR and the objects may be in constant movement, hence changing the orientation between the sensor and the object as well as the object itself. The aggregate 3D representation will be stored in a different store and the object vector over time will be stored with pointers to the 3D objects. Similarly, all background (stationary) objects will be stored as 3D objects that aggregate over time. Each object will be identified with a unique identifier number, in a way that is preserved unique for one or multiple LiDARs. One embodiment of the controller may attempt to uniquely identify objects against a predetermined bank of possible targets, such as various car types or identified stationary objects (such as trees or signs) within the geofenced location where the LiDAR is currently scanning.

At least one embodiment of the controllers may be able to generate a point cloud from the historical time series data collected in a way that remains at high fidelity (loss less) to the original point cloud originating the scans. That loss-less compression of the scanned images will provide significant benefit for the historical storage and real time transmission of the scene data in compressed form.

At least one embodiment includes a vehicle comprising a LiDAR system having any of the previously described features. The vehicle may be an autonomous vehicle. Embodiments include a method that comprises scanning a field of view using a system with one or more of the previously described features.

Embodiments include a method comprising generating laser pulses, optically switching the laser pulses received at an input to each of a plurality of outputs coupled to a corresponding first plurality of fibers arranged in a first linear array oriented along a first axis, pivoting or rotating at least one mirror to redirect light from the first plurality of fibers along a second axis orthogonal to the first axis to illuminate at least a portion of a field of view, directing light reflected from an object illuminated by at least some of the laser pulses via the at least one mirror through a second plurality of fibers arranged in a second linear array to at least one detector, and processing signals from the at least one detector to generate data representing the at least a portion of the field of view. The method may include optically switching by switching the laser pulses from the input of a first layer optical switch to a plurality of first layer outputs within a first switching time, each of the first layer outputs connected to a single input of one of a plurality of second layer optical switches, and for each of the second layer optical switches in turn, switching the laser pulses from the single input to one of a plurality of second layer outputs within a second switching time greater than the first switching time. In at least one embodiment, the method includes a third layer of optical switches each including a single input coupled to one of the plurality of second layer outputs, and a plurality of third layer outputs, and for each of the third layer optical switches in turn, switching the laser pulses from the single input to one of the plurality of third layer outputs within a third switching time greater than the second switching time.

Embodiments of the method may include a first layer optical switch comprising an electro-optic switch and second layer optical switches comprising magneto-optic switches. The method may include pivoting or rotating at least one of a Galvanometric mirror, a rotating prism, a MEMS mirror, or a mirror coupled to a piezoelectric transducer. The method may include directing the laser pulses from the first plurality of fibers through a beam splitter to the at least one mirror, and directing the light reflected from an object illuminated by at least some of the laser pulses through the beam splitter to the second plurality of fibers.

In various embodiments, the method includes directing a first portion of the light reflected from an object and having a first range of wavelengths to a first detector and directing a second portion of the light reflected from an object and having a second range of wavelengths to a second detector. The method may include directing a first range of wavelengths including visible wavelengths and a second range of wavelengths including infrared wavelengths. Directing the first and second portions of light may comprise directing the light reflected from an object through a dichroic beam splitter.

In one or more embodiments, the method includes optically switching the laser pulses and pivoting or rotating the at least one mirror to scan a first portion of the field of view with low resolution and a second portion of the field of view with high resolution. The method may also include optically switching the laser pulses and pivoting or rotating the at least one mirror to scan the field of view at a higher rate having a lower resolution during a first time period, and optically switching the laser pulses and pivoting or rotating the at least one mirror to scan the field of view at a lower rate having a higher resolution during a second time period. The data generated during the first time period may have the same number of data points as the data generated during the second time period. The method may include combining data generated by scans at the higher rate and the lower rate to generate a single frame of data representing the field of view. The higher rate and the lower rate may be frame rates.

Embodiments may also include processing the data to identify an object and optically switching the laser pulses and pivoting or rotating the at least one mirror to scan the object with a different resolution than at least one other portion of the field of view. The method may include processing the data generated by repeated scanning of the field of view to generate a point cloud, and determining a velocity vector including speed and direction for at least some of the point cloud to generate a corresponding vector cloud. The method may include identifying an object within the field of view based on a cluster of vectors within the vector cloud having similar values differing by less than a predetermined tolerance value. The method may also include identifying a plurality of related objects based on a plurality of vector clusters having similar values and categorizing the plurality of objects into one of a plurality of predetermined object types.

In one or more embodiments, the method further includes storing or communicating an object type, object position relative to the field of view, and object vector for each of a plurality of objects within the field of view to provide a compressed representation of the field of view. The method may include communicating the object type, position, and vector to a remotely located computer server. In various embodiments, the method includes receiving a certainty score from the remotely located computer server based on a comparison of the object type, position, and vector to a previously stored object type, position, and vector by the remotely located computer server. The method may include receiving object-related data previously stored by the remotely located computer server in response to the server identifying the object based on one or more of the communicated object type, position, and vector. The object-related data may comprise object historical data, which may include at least one of a movement timestamp, movement direction, speed, and location relative to the field of view. The method may include receiving vector data associated with at least one object that is outside the field of view. The method may include receiving vector data associated with at least one object that is within the field of view, and combining the received vector data with the generated data representing the at least a portion of the field of view.

One or more embodiments may provide associated advantages. For example, various embodiments provide systems and methods for 3D LiDAR scanning that combine solid-state fast scanning devices with slower mechanical scanning devices. While LiDAR strategies using only solid-state devices have an advantage of reliability and robustness, the combination of solid state devices with mechanical scanning devices may provide LiDAR scanning with better resolution and detection range, which may be particularly suited for autonomous vehicle and/or self-driving vehicle applications. The combination of solid-state and mechanical scanning devices may provide improved reliability relative to systems having two mechanical mirrors with one of the mirrors operating with extreme speed and accuracy and subject to wear and tear over billions or trillions of cycles to be able to scan the whole field of view several times a second. Replacing the fast mirror scanning of such strategies with an optical switch, such as a Magneto Optic (MO) switch, may provide faster scanning rates capable of supporting 100 Hz or higher frame rates. An optical switch architecture having cascaded layers or stages of optical switches reduces the switching time of a large port count MO switch to facilitate increased LiDAR frame rates with lower power consumption and overall switch cost. Generating a vector cloud based on changes in point cloud data resulting from the LiDAR scanning facilitates lossless compression of data for high-speed low-bandwidth storage and communication between vehicles and/or an external server or service to provide sharing of detector information and enhanced detection of objects inside and outside of the field of view of the LiDAR sensor.

DETAILED DESCRIPTION

Figure 1:
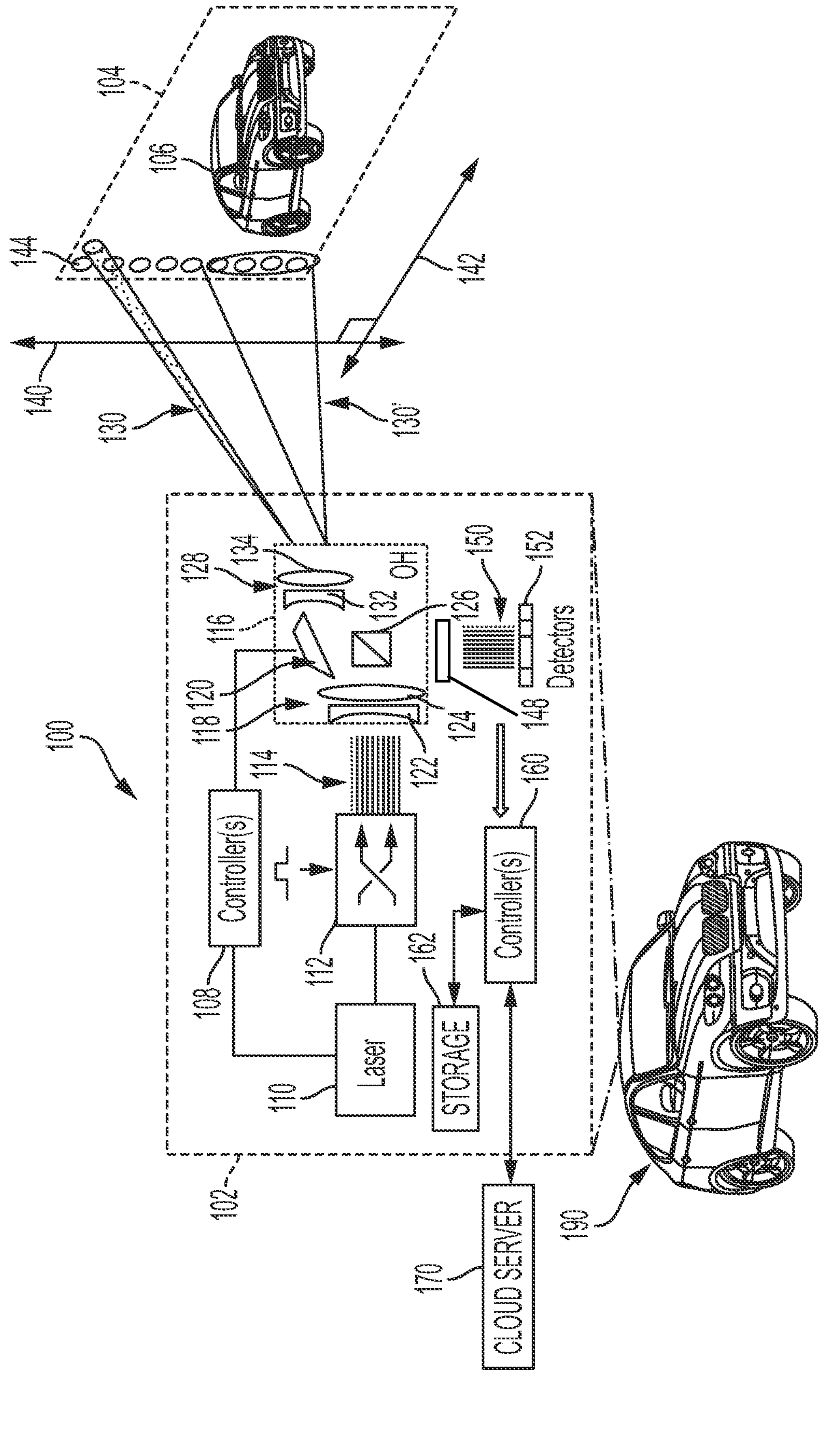
FIG. 1 is a block diagram illustrating operation of embodiments of a system or method for scanning LiDAR with combined fast/slow scanning devices and alternative laser beam shapes.

As required, detailed embodiments are disclosed herein; however, it is to be understood that the disclosed embodiments are merely representative and may be alternatively embodied in various forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter. Similarly, while various embodiments illustrate combinations of features associated with representative implementations, those of ordinary skill in the art will recognize that features from one or more embodiments are readily combinable to form new embodiments that may not be explicitly described or illustrated in the figures.

As used in this description, an image or related terminology is not limited to a visual representation and refers more generally to a data representation of a field of view (FOV). Different types of data, such as location/position, distance/range, intensity, polarization, speed/velocity, etc., may be collected for each measured point or pixel within the FOV to provide a multi-dimensional data array that may be processed by a controller without generating a visual representation of the data. Similarly, references to a pixel do not imply or require a visual representation or display of associated data, or an area on a display screen, but refer more generally to a discrete measurement point or observation point within the FOV. Underlying discrete measurements for a particular pixel location may be referred to as sub-pixels that may be used to improve or enhance the resolution within the pixel. For example, sub-pixels corresponding to measurements generated for a particular (x,y) pixel location from different laser pulses or different characteristics/properties of the laser pulse provide additional data that may be used to detect or identify time domain or spatial domain changes within the pixel to enhance resolution.

Resolution is used in its broadest sense and generally refers to a number of pixels (sometimes referred to as voxels when referring to volume or three-dimensional space) per unit area or volume, with a higher resolution indicative of a higher number of pixels or data points per unit area or volume, which may include a specified FOV, portion of the FOV, or an object within or outside the FOV, for example.

A vehicle is used in its most general sense as something used to carry, transport, or convey something or self-propelled mechanized equipment. An autonomous (or automated) vehicle or semi-autonomous (or semi-automated) vehicle refers to a vehicle capable of sensing its environment or otherwise receiving environmental information and driving without human intervention or with limited human intervention, respectively.

An optical switch refers to an all-optical switch that maintains the signal as light from input to output. An optical switch may use various effects such as electro-optic, acousto-optic, or magneto-optic effects to sequentially switch or route light between an input and one of several outputs in sequence. Devices that convert the optical signal to an electric signal and back to an optical signal to route light signals or pulses from one channel to another, i.e. from an input to one of a plurality of outputs, or from one of a plurality of inputs to an output are not considered optical switches for the purposes of this disclosure. The all-optical switch may be controlled by an electric signal or electronic controller to provide spatial domain switching of optical signals or pulses. An optical switch with no moving parts refers to a device that does not have any moving mechanical components to perform the switching operation, i.e. excludes movable mirrors such as those provided in MEMS based photonic switches.

An optical element refers to any element or component that acts upon light including discrete elements such as mirrors, lenses (including graded index or gradient index lenses), prisms, gratings, etc. as well as integrated optics and holographic optical elements that may also act on incident light to redirect the light and/or modify one or more properties of the light and may include reflective, refractive, diffractive, and/or higher order processes.

A point cloud refers to a dataset that represents a three-dimensional shape or object in space. Each point represents an x, y, and z coordinate of a single point of a detected shape or object relative to a fixed or stationary reference point. Depending on the particular embodiment, each point may also include other data, parameters, or characteristics including color content such as RGB (red, green, blue) values and/or speed/velocity, object identification or object type/category, for example.

A vector cloud refers to a dataset that represents a change or difference of a point or group of points in a point cloud and may characterize the change or difference with respect to a speed and direction (or velocity) of a change in distance from a reference, which may be a previous position or location of the point or group of points, a fixed reference, or a moving reference.

A frame refers to a data representation of the FOV (or portion thereof) for a particular period of time, which may reflect the time required to scan the FOV (or portion thereof) at least once. The frame data may be a mathematical or statistical combination of data generated by two or more scans of the FOV (or portion thereof). For example, the frame data for a particular pixel may be a maximum, minimum, average, or other function or calculation of values for various data associated with that pixel (such as distance, color, speed, etc.). Frame rate refers to the number of frames per unit time and is typically a fraction of the scan rate with multiple scans/frame.

In general, the processes, methods, or algorithms disclosed herein can be performed by a processing device, controller, or computer, which can include any existing programmable electronic control unit or dedicated electronic control unit or controller. Similarly, the processes, methods, or algorithms can be stored as data and instructions executable by a controller or computer in many forms including, but not limited to, information permanently stored on non-writable storage media such as ROM devices and information alterably stored on writeable storage media including electronic, magnetic, and/or optical storage devices. Certain processes, methods, or algorithms may also be implemented in a software executable object. Alternatively, the processes, methods, or algorithms can be embodied in whole or in part using suitable dedicated or custom hardware components, such as Application Specific Integrated Circuits (ASICs), Field-Programmable Gate Arrays (FPGAs), state machines, controllers, or any other hardware components or devices, or a combination of hardware, software and firmware components. Similarly, illustration or description of a process, algorithm or function in a particular sequence or order may not be required to perform the described operation or outcome. Some processes, functions, algorithms, or portions thereof may be repeatedly performed, performed in a different sequence, or omitted for particular applications.

FIG. 1 is a block diagram illustrating operation of embodiments of a system or method for scanning LiDAR with combined fast/slow scanning devices and alternative laser beam shapes. System 100 includes a LiDAR sensor 102 having combined transmitter and receiver elements configured to generate data representing at least a portion of a field of view (FOV) 104 having at least one object 106. System 100 may be mounted to, or otherwise integrated with, a vehicle 190. Vehicle 190 may be an autonomous vehicle (AV), semi-autonomous vehicle, or a conventional vehicle having driver-assistance alerts, displays, controls, etc. based on the signals and associated data provided by sensor 102.

Sensor 102 includes at least one controller 108 controlling a laser 110 and a first optical switch 112 having an input configured to receive laser pulses from the laser 110. In various embodiments, laser 110 is a fiber laser operating in a pulsed mode in the SWIR range with an output nominal wavelength between 900 nm and 1700 nm. In at least one embodiment laser 110 operates at a nominal output wavelength of 1550 nm in the eye-safe region so that sensor 102 may operate with higher power to provide longer range and improved imaging/sensing performance. Laser 110 may be operated to provide a data frame rate of 100 Hz or more, for example, with laser pulse rates between 100-500 KHz, for example. Of course, the data frame rate and laser pulse repetition rate will vary based on the particular application and implementation.

In the representative embodiment illustrated in FIG. 1, first optical switch 112 is an electronically controlled all-optical 1×N switch to transfer optical pulses output by fiber laser 110 from the input of switch 112 to one of the N outputs as controlled by at least one controller, such as controller(s) 108. In one embodiment, optical switch 112 is implemented by a 1×32 magneto-optical switch similar to commercially available switches offered by Agiltron, Inc. of Woburn, MA, USA or Primanex, Inc. of Qingdao, Shandong, China. A magneto-optical switch includes a Faraday rotator to switch the optical pulses so that the switch includes no moving parts to perform the switching operation. Various embodiments may include a 1×N optical switch that includes a multi-stage or multi-layer cascaded architecture as illustrated and described with reference to FIGS. 3-5 to reduce the switching time of a large port-count optical switch without the required increase in driving voltage and current required for the commercially available magneto-optical switches in the examples above. System 100 may also include a narrowband or wideband optical filter 148, that is located in the path of the receiving optics and centered around the wavelength of the transmitting laser, to reduce the amount of ambient sunlight reaching the detectors 152 and increasing system noise.

Each of the outputs of switch 112 is coupled to one of a first plurality of fibers 114 positioned in a linear array along a first axis or direction. In one embodiment, the linear array of transmitter fibers 114 is oriented vertically. The outputs of fibers 114 deliver laser pulses generated by the laser 110 to an optical head (OH) 116. In one or more embodiments, OH 116 is remotely located relative to other components of sensor 102. OH 116 includes a transmission optics 118, which may be implemented by at least one optical element configured to receive the laser pulses from fibers 114 and to redirect the laser pulses to a mirror 120 configured to pivot, rotate, or otherwise move in response to a control signal from controller(s) 108, such that the associated light 130 (or 130') is directed into a different angle to illuminate a corresponding portion of the FOV 104 containing one or more objects 106. Mirror 120 may be implemented by a Galvanometric mirror, a rotating prism, a MEMS mirror, or by a PZT based mirror, or any other mechanical rotating/moving/steering mechanism that can move the laser beam in space in one dimension accurately enough for the particular application. The at least one optical element of transmission optics 118 may include a diverging lens 122 or one or more asymmetric, aspherical, and/or cylindrical optical elements to provide a generally circular pencil output beam 130, or an oval or elliptical output beam 130' at a specified angle based on the desired coverage portion of FOV 104. Optics 118 may also include one or more converging lenses 124 or similar optical elements. The at least one optical element of transmission optics 118 may include one or more lenses with each lens associated with a single one of fibers 114, a group of fibers 114, or all fibers 114.

In the representative embodiment illustrated in FIG. 1, OH 116 includes combined transmitter and receiver components, which may include a beam splitter 126 that redirects laser pulses from fibers 114 to mirror 120 and then through combined transmitter/receiver optics 128 to illuminate a corresponding portion of the FOV 104. Optics 128 may include one or more diverging lenses 132, converging lenses 134, and/or one or more asymmetric, aspherical, and/or cylindrical optical elements, for example. During scanning of the FOV 104, controller(s) 108 are configured to control optical switch 112 to direct the laser pulses from laser 110 through each of the plurality of switch outputs and fibers 114 to scan output light beam 130 along a first axis 140 corresponding to a first position of mirror 120. Controller(s) 108 are further configured to control mirror 120 to pivot or rotate to a second position to move the scanning laser pulses to an adjacent position along a second axis 142, which is orthogonal to the first axis 140. This process is repeated to scan at least a portion of FOV 104. In one embodiment, sensor 102 is configured such that operation of switch 112 scans beam 130 (or 130') in a vertical direction and mirror 120 is pivoted or rotated to scan an adjacent column of pixels 144. In another embodiment, sensor 102 is configured such that operation of switch 112 scans beam 130 (or 130') in a horizontal direction and mirror 120 is pivoted or rotated to move the scanning beam in a vertical direction to scan an adjacent row of pixels 114. Those of ordinary skill in the art will recognize that orthogonal axes 140, 142 need not be oriented vertically and horizontally as shown.

As the FOV 104 is scanned with the laser pulses, light reflected from one or more objects 106 passes through combined optics 128, is reflected by mirror 120, and passes through beam splitter 126 to a second plurality of fibers 150 that deliver the reflected light to at least detector 152. Each of detector(s) 152 may be implemented by a photodiode such as an avalanche photodiode (APD), a PIN diode, a Schottky barrier photodiode, or any other optical detector with similar sensitivity that provides the desired signal-to-noise ratio (SNR) for a particular application. Detector(s) 152 provide corresponding signals to one or more controller (s) 160. Depending on the particular implementation, controller 160 may perform functions other than purely control functions and may contain various electronic circuitry and solid-state devices such as an A/D that converts the analog signal to digital data, FPGAs that analyze the data, a processor that calculates the position of each detected point, and links for communicating the data to a remote PC or monitor, for example. Controller(s) 160 generate data representing at least a portion of FOV 104, including object 106. Controller(s) 160 may store data representing the FOV 104 in local storage 162 and/or communicate data to a remotely located external computer, such as a cloud server 170, for example. Controller(s) 160 may include one or more of controller(s) 108 and in some cases sensor 102 may include only a single controller.

The plurality of fibers 150 can be bundled into groups, such as 7 fibers grouped into one bundle, where each bundle is connected to a single detector out of a line of detectors 152. The connection of multiple fibers into a single detector can be done efficiently through a combination of high NA optical lenses that project the object plane of the multiple cores of the fibers into the image plane of the detector with greater than 95% efficiency. This method of bundling fibers into a single detector is possible since not all fibers are illuminated by the transmitting laser at all times—the laser is switching between fibers as explained in FIG. 1. The bundling of fibers from different groups that are illuminated at different time slots allow for a single detector to sample each fiber at the right time. This bundling method increases the number of receiving fibers in the system and therefore the resolution of the image without increasing the number of detectors.

In one embodiment, fibers 150 are arranged in a linear array with each of the fibers having an associated detector such that each pixel 144 of FOV 104 corresponds to one of the detectors 152. In one embodiment, each laser pulse forms a pencil output beam 130 that illuminates an associated pixel 144 that is detected by one of the detectors 152 such that the number of detectors 152 corresponds in number to the first plurality fibers 114 and the second plurality of fibers 150. In another embodiment, an expanded elliptical or oval laser beam 130' has an angular divergence along a first axis that is an integer multiple number of times greater than an angular divergence along a second axis perpendicular to the first axis and illuminates multiple pixels 144. In this embodiment, the second plurality of fibers 150 includes the integer multiple times a number of fibers in the first plurality of fibers 114 and the inter multiple times the number of outputs of the optical switch 112. This reduces the number of output ports required for the optical switch 112 to scan the associated axis of the FOV 104, or alternatively provides a larger FOV 104 for the same number of output ports. For example, the extended laser beam 130' may illuminate a large area of the target object 106 and allows for the detectors 152 to receive reflection from five (5) pixels 144 on the target (assuming the sampling rate of the detectors is much faster than the switch time of the optical switch 112), and therefore increase the capture rate of an image by a corresponding factor or multiple of five. The system also benefits in this case from using a lower count optical switch 112 (five times lower number of output ports in this case). The lower count optical switch 112 requires ⅕ the number of fibers 114 to couple the switch 112 to the OH 116. This provides higher output power per port and lower overall cost of the system.

In one embodiment, at least one of controllers 108, 160 is a microprocessor-based controller having associated non-transient memory or computer readable storage media 162 for storing data representing instructions executable by the controller(s) to perform one or more control functions or algorithms as described herein. Where more than one controller is provided, the controllers may communicate to exchange data and/or coordinate or cooperate to perform a particular task, function, algorithm, etc.

One or more of controller(s) 108, 160 may control sensor 102 to repeatedly scan the FOV 104. Data from two or more scans may be combined to form a single frame of data representing the FOV. For example, data for a particular pixel 144 represented in a frame for the FOV 104 may be an average of values from ten scans of the FOV 104. Alternatively, ten laser pulses may be generated for each pixel 144 before moving the beam 130 to another location with the values averaged to generate a frame of data.

In one or more embodiments, controller(s) 108, 160 may operate in one or more manually or automatically selected adjustable scanning modes. In one embodiment, controller (s) 108, 160 control operation of sensor 102 to provide a first mode with a higher frame rate and lower resolution and a second mode with a lower frame rate with higher resolution with both modes generating the same number of data points. For example, LiDAR sensor 102 may operate in the first mode generating X points/scan at 100 scans/s or the second mode with 10× points/scan at 10 scans/s for the same FOV 104. Both scan modes will produce the same number of points per second, with software control of the tradeoff between resolution and scan frequency. The scanning mode may be manually selected by an occupant of vehicle 190 via an associated interface, or automatically selected in an autonomous vehicle depending on operating conditions, location of the vehicle, traffic, and number of identified objects 106 in the environment, for example. Alternatively, or in combination, the first and second modes may scan only a portion of the FOV 104 at higher resolution while keeping the same scan rate. For example, if vehicle 190 is traveling through a tunnel, sensor 102 may continue to operate at 100 Hz scanning only one-half of the FOV 104 while doubling the scan resolution. This mode is controlled using software to provide a scan mask that provides more resolution based on the size of the covered region.

Controller(s) 108, 160 may also control sensor 102 using a set of object masks to scan only regions designated by the object masks at higher resolution. The higher resolution data may be input to a classification engine to improve object classification for specific objects.

Controller(s) 108, 160 may also be configured to operate sensor 102 in a hybrid scanning mode switching between scan modes within time slices and running each time slice at a different configuration and combining or fusing the results within a particular context. The hybrid mode allocates each of the available scans per second into a different scan purpose according to a scan plan for the context. The scan plan(s) can be stored locally within the LiDAR sensor 102 or vehicle 190 to provide a hybrid plan that can be accessed and used with ease through full software control. For example, a scan plan may specify three scans at 3× resolution (requiring nine time slices), followed by a single time slice allocated to scanning identified objects at an adjustable higher resolution (depending on the object mask size). Such a hybrid plan will provide an effective 30 Hz scan at 3× resolution (taking 90% of the scan capacity per second) with high resolution images of objects that provide better object classification capability for actual objects.

Repeated scans by LiDAR sensor 102 of the FOV 104 provide smaller shifts over time of the objects 106 and associated points that form the point cloud. Repeated high-speed scans at frame rates higher than 30 Hz may be used to associate the same objects, such as object 106, across two or more scans. Once the same object 106 is clearly identified, controller(s) 108, 160, cloud server 170, or another controller or processor of vehicle 190 can assess the speed for each point in the point cloud based on a change in distance of the object 106 from the sensor 102 over time between scans. As a result, the controller can generate a vector cloud instead of, or in combination with, a simple point cloud. Each point in the point cloud is assessed a vector representing updated or changed motion, direction, and speed. The point vector is more accurate than other methods, such as relying on doppler effects associated with frequency modulated waves (which are not accurate for orthogonal movement). This capability is not practical with currently available LiDAR sensors that have frame rates on the order of 10 Hz. For example, assuming a target object 106 moving at 100 km/h head-on to vehicle 190 also driving at 100 km/h, the relative speed between vehicle 190 and the target object 106 is 200 km/h, or 55 m/s. At a 10 Hz frame rate (with 100 ms between frames) the target object 106 moves 5.5 m between frames, which is more than the length of the object 106 being measured such that the target object 106 could be lost in the incoming traffic. In contrast, a LiDAR sensor 102 that provides 100 Hz frame rate at those relative sensor-to-object speeds will be able to track and identify individual vehicles (moving at 0.5 m between successive frames). The higher frame rate LiDAR sensor 102 has the capability to more accurately track direction and speed, reducing or eliminating the possibility of object misidentification between successive frames for the same FOV 104.

Figure 2:
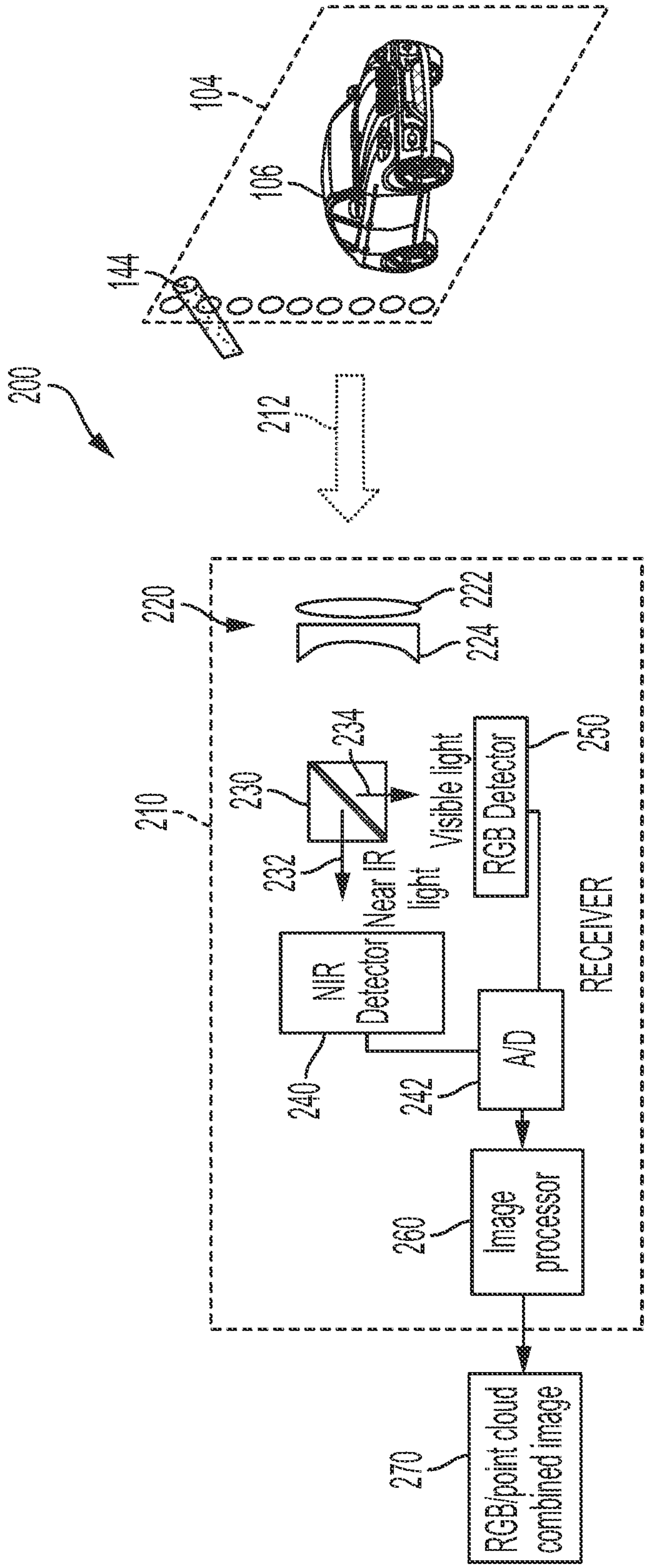
FIG. 2 is a block diagram illustrating a LiDAR detector capable of forming a combined LiDAR/visible light image using natural light reflected from objects in the field of view (FOV).

FIG. 2 is a block diagram illustrating a LiDAR receiver/detector capable of forming a combined LiDAR/visible light image using natural light reflected from objects in the field of view (FOV). System 200 includes a receiver/detector 210 that may be used as a separate OH in combination with a LiDAR sensor 102 as described with reference to FIG. 1. Alternatively, the primary components of receiver/detector 210 may be integrated within a combined sensor 102 receiving reflected light from fibers 150 and replacing one or more detectors 152.

Receiver/detector 210 receives reflected light 212 from object 106 within FOV 104. Reflected light 212 includes reflected light from the laser pulses illuminating pixels 144 in combination with natural (full spectrum) or ambient light reflected from one or more objects 106. The reflected light 212 passes through receiver optics 220, which may include at least one optical element such as converging or focusing lens 222 and diverging lens 224. After passing through receiver optics 220, the reflected light 212 is split or divided based on wavelength by a dichroic beam splitter 230 with a first range of wavelengths 232 passing generally straight through to a first detector 240 and a second range of wavelengths being redirected at by dichroic beam splitter 230 to a second detector 250. In this embodiment, the first detector 240 detects near-infrared (NIR) wavelengths including the laser pulses generated by laser 110 and the second detector 250 detects visible light (which may be referred to as red-green-blue or RGB light). Analog signals generated by detectors 240, 250 may be converted to digital data by A/D converter 242 prior to being provided to an associated image processor 260. Image processor 260 may be implemented by a separate controller or processor, or one of the one or more controllers 108, 160.

The addition of a passive RGB detector 250 along the receive path of the optics of the LiDAR sensor detects the visible colors of the natural ambient light that is being reflected from the targets 106 in the FOV 104, in parallel to these targets 106 being scanned, pixel by pixel, by the laser 110. The image processor 260 may then create a three-dimensional LiDAR image at the NIR wavelength of the laser (such as 1550 nm) that is matched and overlayed with a color two-dimensional image of the object 106 within the FOV 104 and add significant value to the point cloud data of the scene being scanned. While a representative arrangement is illustrated in FIG. 2, other optical arrangements are possible within the scope of the claimed subject matter to implement a LiDAR sensor with such a combined image.

Figure 3:
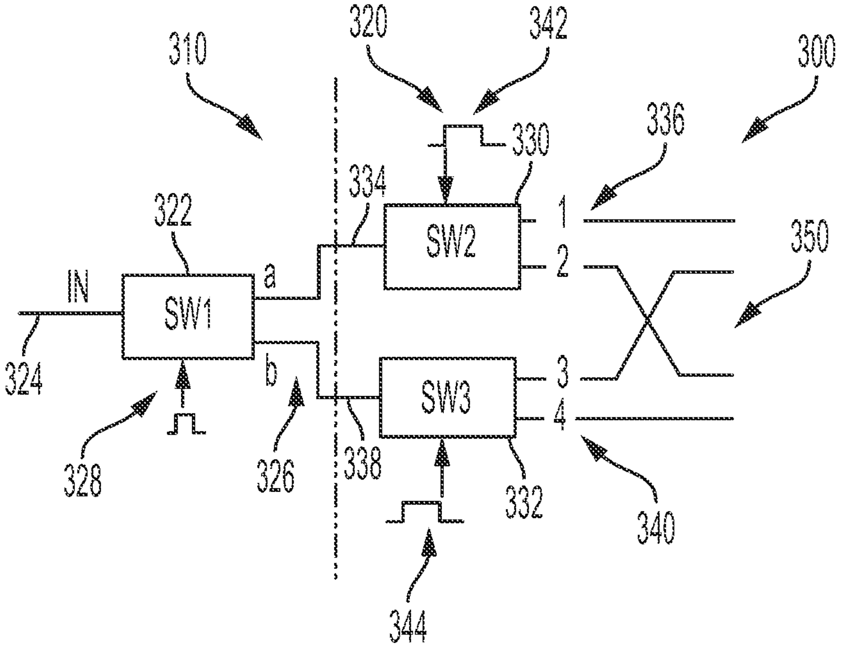
FIG. 3 illustrates a scalable optical switch architecture having layers of optical switches to reduce switching time of the optical switching devices in layers connected to an input layer.
Figure 4:
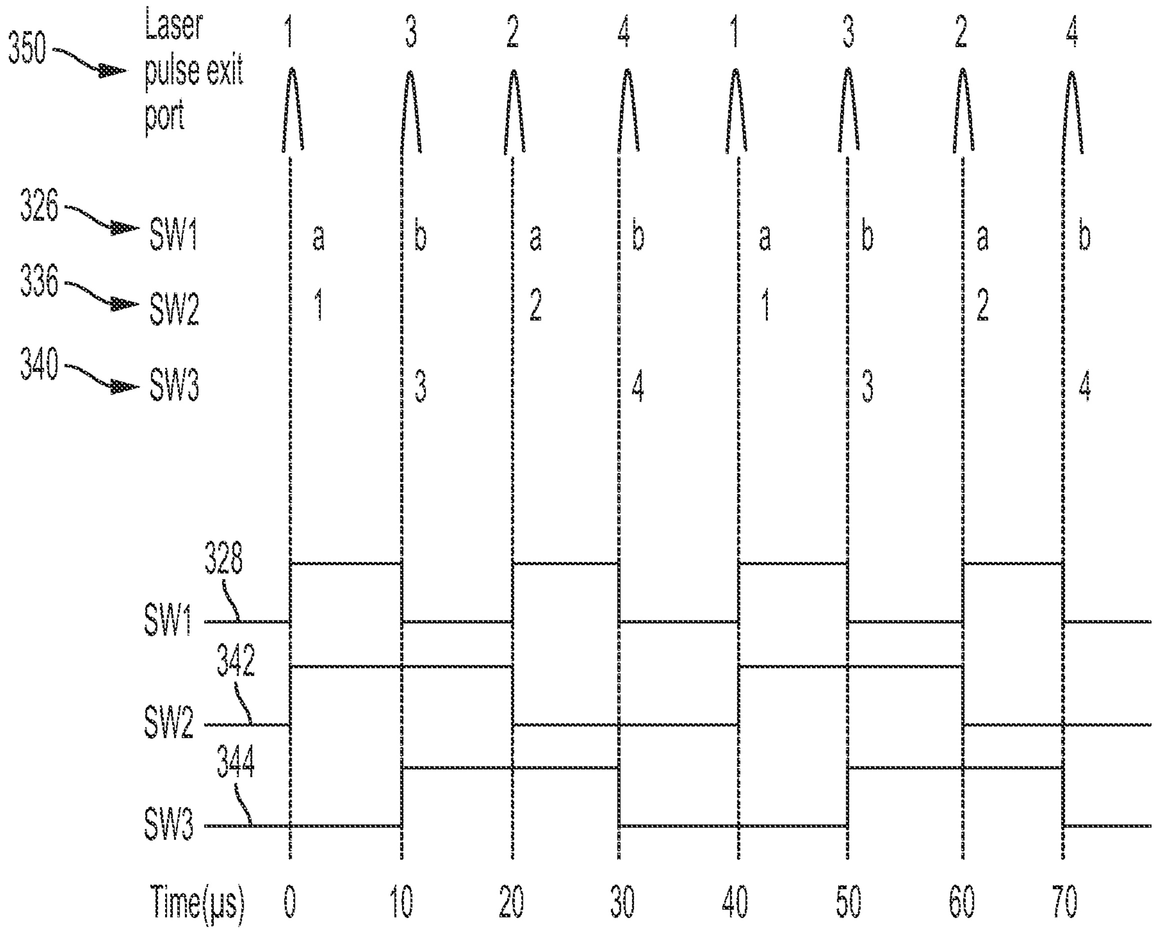
FIG. 4 is a timing diagram illustrating operation of the scalable optical switch architecture of FIG. 3.

FIGS. 3-4 illustrate a scalable optical switch architecture having layers of optical switches to reduce switching time of the optical switching devices in layers or stages connected to an input layer or stage, each layer or stage having similar switching or timing requirements. The relatively simple representative embodiment of a 1×4 optical switch illustrated in FIGS. 3-4 explains the operating principles and architecture for reducing the switching time of layers connected to the input layer and can be scaled to multiple layers having the same or different switch configurations for each layer to construct a 1×N optical switch as further demonstrated by the 1×32 switch embodiment having three layers of different switch configurations as illustrated and described with respect to FIG. 5. As shown in FIG. 3, optical switch 300 includes an input layer 310 (first layer) and an output layer 320 (second layer). Input layer 310 includes a single switch 322 (SW1) having a single input 324 and a plurality of outputs 326. While input switch 322 is implemented by a 1×2 optical switch, the input layer switch configuration does not limit the overall output port count of optical switch 300 as demonstrated by the 1×32 switch embodiment illustrated in FIG. 5, which also has a 1×2 switch for the input layer. The use of a 1×2 switch for the input layer may provide various advantages relative to different switch configurations for some applications, but is not limiting. The input layer 310 can be generalized or extended to architectures having a single switch with two or more outputs, such as a 1×M switch configuration. Switch 322 includes at least one timing, gating, or switching signal input that determines which one of the plurality of outputs 326 is coupled to the input 324. Switching signal input 328 is connected to an associated controller or control circuitry (not shown) that generates the switching signal within the designated switching time for the particular architecture of switch 300. The controller or control circuitry may be integrated within the switch to provide different switching signals for the switches in different layers in response to a master timing or switching signal from an external controller (not shown) as illustrated and described with reference to FIG. 4.

Output layer 320 of switch 300 includes a plurality of 1×P optical switches represented by 1×2 optical switches 330, 332. Each switch of the (second) output layer 320 includes an associated single input 334, 338 connected to one of the plurality of outputs 326 of the (adjacent) input/first layer 310. Each switch of the (second) output layer 320 also includes an associated plurality of outputs 336, 340 and an associated timing/gating/switching signal input 342, 344 that determines which of the plurality of switch outputs 336, 340 is coupled to an associated switch input 334, 338. The plurality of outputs 336, 340 of the output layer 320 may be arranged to provide exit ports 350 in sequential switching order as described with reference to FIG. 4. The particular arrangement or repositioning of outputs between the output layer 320 and the exit ports 350 will vary depending on switch architecture including the number of switches and switch configuration of each layer. Alternatively, switch 300 may connect exit ports 350 to output layer 320 in any convenient order with the exit ports 350 coupled to a corresponding number of fibers arranged or repositioned in a linear array such that the output laser pulse appears sequentially across adjacent fibers to provide scanning along a specified axis as previously described.

FIG. 4 is a timing diagram illustrating operation of the scalable optical switch architecture of FIG. 3. As illustrated in FIG. 4, the switch architecture illustrated in the representative embodiments of FIGS. 3 and 5 reduces the switching time of a large port count optical switch to increase the overall switching speed and facilitate increased frame rates for a LiDAR sensor without the otherwise required increase in voltage and current to drive a conventional magneto-optical switch architecture. The switching architecture illustrated by the representative embodiments of FIGS. 3 and 5 supports faster switching times with low power consumption and lower overall switch cost.

With reference to FIGS. 3 and 4, a laser pulse enters the input 324 of switch 322 and coupled to either of output ports 326*a* or 326*b* depending on the switching signal 328, which changes state every 10 μs (as an example). A laser pulse at output port 326*a* travels to input 334 of switch (SW2) 330 and then to either of output ports $336_1$ or $336_2$ depending on the state of switching signal 342 for SW2. Similarly, a laser pulse at output port 326*b* travels to input 338 of switch (SW3) 332 and then to either of output ports $340_3$ or $340_4$ depending on the state of switching signal 344 for SW3. The switching signals 342, 344 change states every 20 μs in this case, with signal 342 for SW2 time-shifted relative to signal 344 for SW3 by 10 μs. As such, laser pulses input to switch 300 every 10 μs appear at exit ports 350 every 10 μs but only input layer 310 switches within 10 μs as compared to output layer 320 that switches within 20 μs. For the arrangement illustrated in the embodiment of FIGS. 3-4, this results in the laser pulses at output ports in time sequence of: $336_1$-$340_3$-$336_2$-$340_4$ that may be repositioned in a linear array of exit ports 350 as shown in FIG. 3.

From the example optical switch architecture of FIGS. 3-4, it should be clear that the architecture can be easily scaled or extended from a 1×4 configuration with two layers to a 1×8 configuration by adding a third layer of 1×2 switches. The third layer of 1×2 switches will require a switching time of 40 μs instead of 20 μs as in the 2nd layer or 10 μs in the 1st layer, and so forth.

Figure 5:
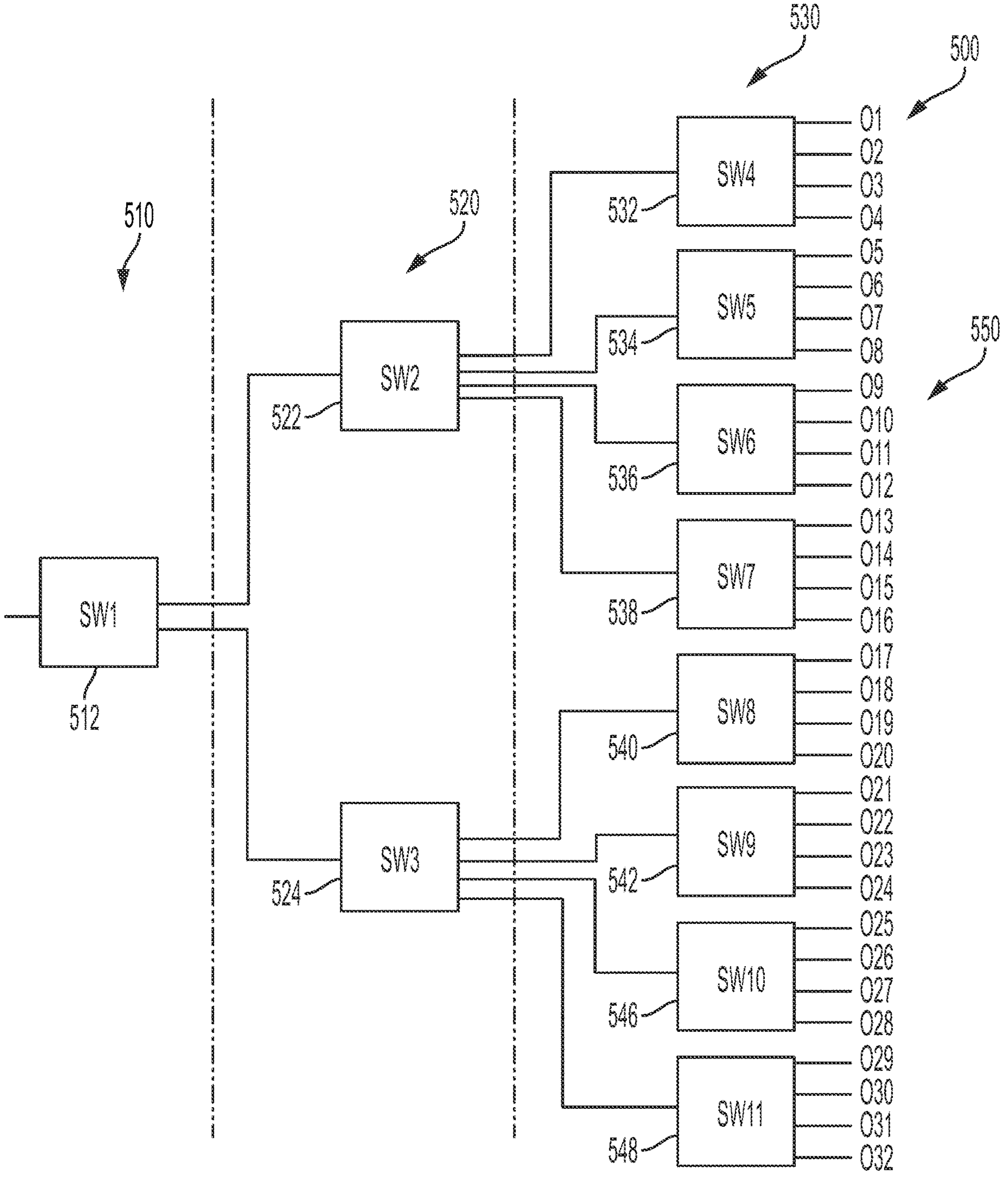
FIG. 5 illustrates a representative 1×32 optical switch having three layers or stages constructed based on the scalable switch architecture of FIG. 3.

FIG. 5 illustrates a representative 1×32 optical switch having three layers or stages constructed based on the scalable switch architecture of FIG. 3 with timing signals similar to those illustrated and described with respect to FIG. 4. Optical switch 500 includes an input layer 510 having a 1×2 switch 512, a middle layer 520 having two 1×4 switches 522, 524, and an output layer 530 having eight 1×4 switches 532, 534, 536, 538, 540, 542, 544, 546, and 548. Each switch SW1-SW11 includes a switching input (not shown) that receives a corresponding switching signal that determines which of the plurality of outputs is coupled to the input similar to the example described with reference to FIGS. 3-4. For an input layer switching signal having a switching time of X, each of the two switches 522, 524 of middle layer 520 will have a switching signal with a switching time of 2× offset by X relative to one another. Similarly, the eight switches 532-548 of output layer 530 will each have a switching signal with a switching time of 8× time-shifted by X relative to one another, i.e. the switching signal for SW5 is time-shifted by an integer multiple of X relative to each of the other switching signals, such as 2×, whereas the signal for SW11 is time-shifted by 7× relative to the signal for SW4. Of course, the switching times and time shifting of signals for each layer will depend on the number of switches in the layer and the configuration of each switch in the cascade relative to the number of switches in previous layers.

The outputs of switches 530-548 may be rearranged to provide a linear array of sequential exit ports 550 as previously described with reference to FIGS. 3-4. In the example of FIG. 5, the outputs 1-32 would be arranged in the following switching sequence order: 1, 17, 5, 21, 9, 25, 13, 29, 2, 18, 6, 22, 10, 26, 14, 30, 3, 19, 7, 23, 11, 27, 15, 31, 4, 20, 8, 24, 12, 28, 16, 32.

As illustrated in the embodiments of FIGS. 3-5, each layer connected to the input layer includes switches that have switching speeds slower than the input layer. More specifically, each layer has a switching speed between the input layer switching speed and an integer multiple of the input layer switching speed that corresponds to an integer number of switching elements in the layer. In the example of FIGS. 3-4, the output layer includes two switching elements (SW2 and SW3) that have a switching speed between the input layer switching speed (10 μs) and two times the input layer switching speed (2×10 μs=20 μs). In the example embodiment of FIG. 5, the input layer has a switching speed of 10 μs, the middle layer includes two switches and has a corresponding switching speed of 20 μs (2×10 μs), and the output layer includes eight switches having a switching speed of 80 μs (8×10 μs=80 μs). Similarly, the switching signals for each switch in a layer will be time shifted by the switching speed of the input layer relative to one another. In the example embodiment of FIGS. 3-4, the switching signals for each switch in the second layer 320 are time-shifted by the switching speed (10 μs) of the input layer 310. This relationship applies regardless of the particular size/configuration of switches in the layer, i.e. whether the switches are 1×2, 1×3, 1×4, or 1×P switches. For example, an optical switch may include an input layer having a single 1×3 switch with switching speed of 10 μs, a second layer of three 1×4 switches with switching speed of 30 μs and an output layer of twelve 1×2 switches with a switching speed of 120 μs. As another example, an optical switch may include seven 1×2 switches arranged in three layers with an input layer switching at 20 μs, a middle layer with two switches switching at 40 μs (2×20 μs), and an output layer with four switches switching at 80 μs (4×20 μs).

As shown in the representative embodiments of an optical switch architecture with respect to FIGS. 3-5, the optical switch 300, 500 includes a plurality of layers or stages including at least an input layer 310; 510 with a first switching element 322; 512 and an output layer 320; 530 with a plurality of switching elements 330-332; 532-548. Each of the first switching element 322; 512 and the plurality of switching elements 330-332; 532-548 configured to optically switch light in sequence between a single input, e.g. 324, and a plurality of outputs, e.g. 326, in response to a control signal, e.g. 328. The single input 324; 512 of the first switching element of the input layer 310; 510 comprises the input of the optical switch 300; 500, and the plurality of outputs 350; 550 of the switching elements of the output layer 320; 530 comprise the outputs of the optical switch 300; 500. Each layer 310, 320; 510, 520, 530 has the single input of each switching element in the layer connected to one of the plurality of outputs of an associated one of the switching elements in an adjacent layer. The first switching element 322; 512 operates at a first switching speed and the switching elements of each layer 320; 520, 530 operate at a slower switching speed than the first switching speed, and more specifically at a switching speed between the first switching speed and an integer multiple of the first switching speed corresponding to an integer number of switching elements in the layer. The switching signals for each switching element within a particular layer are time-shifted by an integer multiple of the first switching speed relative to other switching elements within the particular layer.

An optical switch architecture according to this disclosure may include switching elements (switches) of the same type or operating principle, such as all magneto-optical switches, for example. Alternatively, the input layer switching element may be replaced with a different type of switching element, such as an electro-optic switching element, or a ceramic-based switching element, or any other fast optical switch. Commercially available solid-state optical switching elements or switches that may be suitable include the NANONA™ line of switches using OPTOCERAMIC™ material operating in a free-space architecture produced by Boston Applied Technologies, Inc. (BATi) of Woburn, MA, USA. While the use of an electro-optic or ceramic-based switch may require less power than a magneto-optic switch to provide a desired fast switching speed, these switches typically have higher optical loss and higher cost than a magneto-optic switch. Replacing only the input layer or possibly a second layer with a small number of switches with an electro-optic or ceramic-based switch mitigates these effects on the overall optical loss and cost of the switch while providing the fast switching speeds desired to achieve 100 Hz or higher frame rates for a LiDAR sensor.

Figure 6:
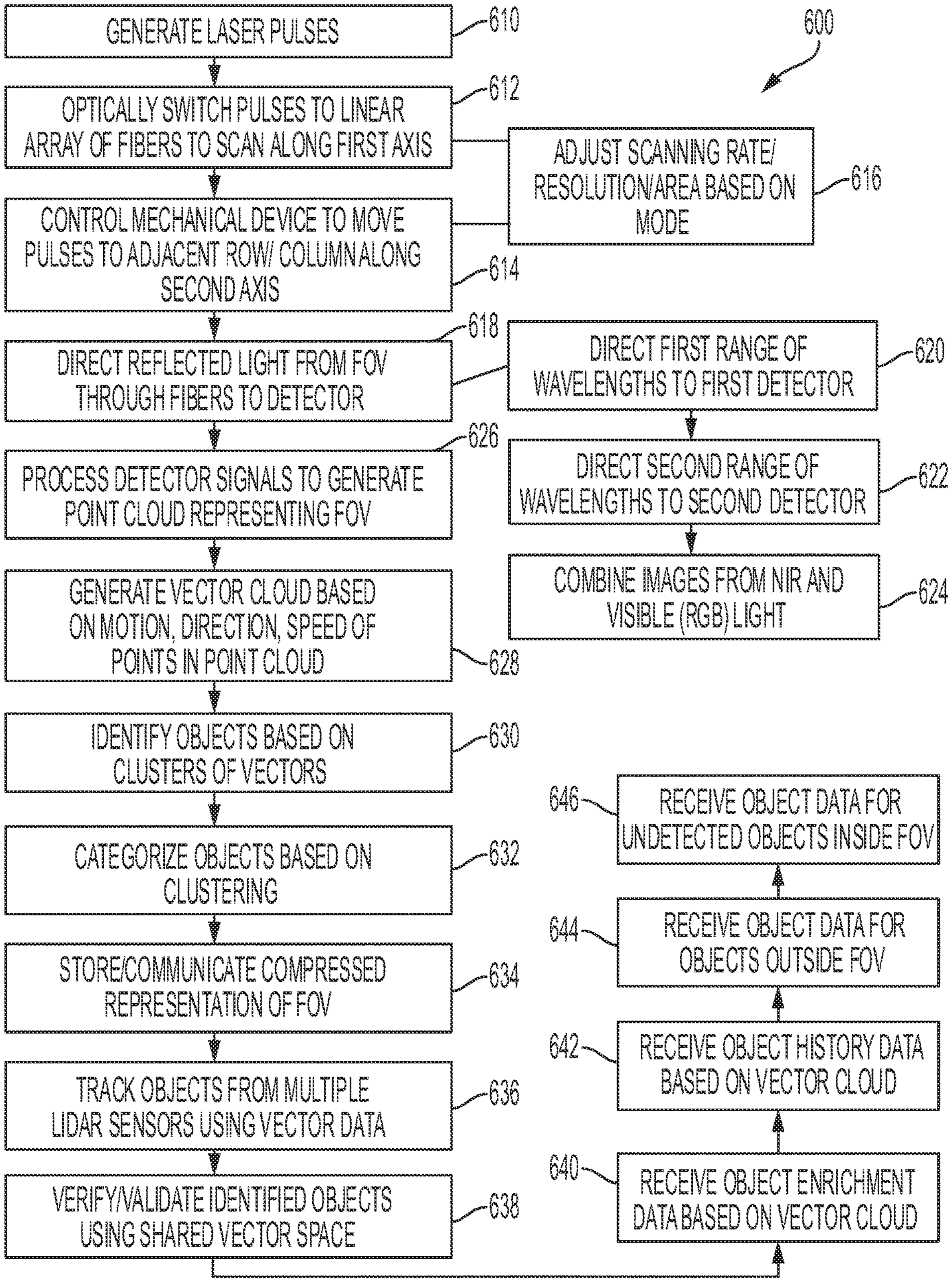
FIG. 6 is a flowchart illustrating operating of a system or method for LiDAR scanning using combined solid-state and mechanical scanning devices.

FIG. 6 is a flowchart illustrating operating of a system or method for LiDAR scanning using combined solid-state and mechanical scanning devices. The system or method 600 include generating laser pulses as represented at 610, and optically switching the laser pulses received at an input to each of a plurality of outputs coupled to a corresponding first plurality of fibers arranged in a first linear array oriented along a first axis as represented at 612. The system or method include controlling a mechanical device to move pulses to adjacent rows/columns along a second axis as represented at 614. This may include pivoting or rotating at least one mirror to redirect light from the first plurality of fibers along a second axis orthogonal to the first axis to illuminate at least a portion of a field of view. One or more adjustable scanning modes may be provided to adjust the scanning rate, resolution, and/or area by corresponding control of the optical switching and mechanical positioning devices as represented at 616. For example, an adjustable scanning mode may be selected by a vehicle operator or by an autonomous vehicle controller to manually or automatically select a scanning mode providing higher scan rates or higher resolutions depending on the driving conditions, location of the vehicle, and/or traffic and number of identified objects in the environment. For example, the system or method can operate in one mode generating X points per scan at Y scans per second or 10× points per scan at Y/10 scans per second with the same FOV with both scan modes generating the same number of points per second. In another adjustable scanning operating mode, the system or method may scan only a portion of the available FOV at higher resolution while keeping the same scan rate. For example, a vehicle traveling in a tunnel may scan at 100 Hz, but scan only one-half of the FOV while doubling the scan resolution. This mode may be controlled by the software that provides a scan mask to provide increased resolution based on the size/area of the scanned portion of the FOV. In another adjustable scanning mode, an object mask is used to scan only those regions of the object at higher resolution to provide better classification data for specific objects.

In yet another scanning mode, the system or method may change scan modes within time slices, running each time slice at a different configuration and combining or fusing the result within a particular context. A representative hybrid scanning mode allocates the available scans per second based on different scanning purposes according to a scan plan. One or more scan plans may be stored for subsequent access to be selected for a particular context by the software instructions executed by one or more controllers.

The system or method include directing light reflected from an object in the field of view illuminated by at least some of the laser pulses via the at least one mirror through a second plurality of fibers arranged in a second linear array to at least one detector as represented at 618, which may include directing a first portion of the light reflected from an object and having a first range of wavelengths to a first detector as represented at 620 and directing a second portion of the light reflected from an object and having a second range of wavelengths to a second detector as represented at 622. The first range of wavelengths may include visible wavelengths and the second range of wavelengths may include infrared wavelengths, wherein directing the first and second portions of light comprises directing the light reflected from an object through a dichroic beam splitter. Signals from the first and second detectors may be processed and combined or overlayed as represented at 624.

The signals from one or more detectors are processed to generate a point cloud as represented at 626 representing at least a portion of the field of view. Repeated scans of the same FOV with high frame rates provide smaller changes over time of the objects and points in the point cloud. Repeated high-speed scans at framerates higher than 30 Hz may be used to identify objects across two or more scans. After the same object is clearly identified, the speed for each point in the point cloud can be determined. As a result, the system or method can generate a vector cloud as represented at 628 rather than a simple point cloud. Each point on the cloud will be assessed a vector representing updated motion, direction, and speed. Such point vector is more accurate than other methods, such as relying on doppler effects produced by frequency modulated waves (which are not accurate for orthogonal movement).

As represented at 630, the system or method may identify objects and associated boundaries based on clusters of vectors having similar values, i.e. that differ by less than a predetermined threshold. The present disclosure recognizes that shared objects move at the same speed in the same direction and will have the same vector cloud (within some tolerance). A vector cloud will see all points of the same objects as sharing the same motion vector. As a result, it is easier for the processor software algorithms to identify objects and associated boundaries for clustering and identification purposes.

Objects may be categorized based on clustering as represented at 632. Based on accurate identification of objects that are sharing the same or similar motion vectors, groups or clusters of related objects may be more easily classified or categorized into specific types of objects using the vector cloud. Identification can isolate recognized object types, such as specific vehicle types or even a vehicle make/model in addition to more generic environmental objects such as trees or signs.

The system or method store and/or communicate vector cloud data, which may include distance and speed of each point in the FOV as a compressed representation of the FOV as represented at 634. After object categorization due to shared speed and clustering, the system or method may communicate a compressed assessment of the scene based on objects, location, and a unified motion vector to other suitably equipped vehicles and/or an external cloud server or service. The parameters characterized by the vector cloud can be used to assess the FOV and object mapping better than relying on only the location or speed of an identified object. After objects in the vector cloud have been characterized and identified, the system or method may locally store the objects appearing in successive scans as a single reference to the three-dimensional object (that is completed in more detail over time). Similarly, a single reference to a previously communicated object may be sent to a remote server or service rather than resending the associated object vector cloud. Each scan does not need to store individual points or vectors in the vector cloud in order to retrieve the image without loss. The compressed image based on the vector cloud may be used to store an object reference, location, orientation and single motion vector for the entire object. Such information is sufficient to regenerate the vector cloud and is significantly more compressed than the points representing the object. Non-moving objects in the scan may also be stored once as a scene object and referenced in subsequent scans.

Vector cloud data may be transferred to one or more remote servers that provide services such as mapping road traffic and other objects within a particular scene or region as generally represented at 636. Representing target objects by speed vectors and not by points facilitates communication of data for detected targets to an external service that maps or monitors a particular region or even the entire world. Such a service would provide similar capabilities as air-traffic controllers do for monitoring aerial traffic and preserving one or more shared/common points of reference for multiple vehicles regardless of any particular vehicle's sensor capabilities. The compressed vector-based understanding of the scene can be shared without loss with high efficiency at scale by many vehicles within the same "traffic cell" using very little bandwidth despite the very high frame rate.

As represented at 638, one or more objects within a vector cloud detected by scanning the field of view may be verified or validated using corresponding data from a shared vector space provided by an external server or service. The external service receives vector cloud information from multiple vehicles within a particular region as previously described. This shared vector space may be used to compare data from a particular vehicle to data previously shared by other vehicles. Such services can provide verification or validation for the vector cloud sent from the LiDAR sensor of the particular vehicle assessing and returning a certainty score for every object identified in the vectors. The received verification or certainty score will provide a match or correlation value between the object identified and its position and motion vector stored by the service relative to the corresponding object position and motion determined by the LiDAR sensor.

The system and method may receive object classification and enrichment data for one or more identified objects based on the vector cloud data as represented at 640. External services may provide more complete or reliable information for one or more identified objects and communicate this information to the vehicle LiDAR sensor as data enrichment. Such information can enhance distant objects that are detected by the LiDAR with insufficient information to positively identify or categorize the object. For example, an object identified from 200 or more meters may not provide enough data to the LiDAR system for identification or categorization. Based on the vector cloud data communicated to an external service or server, the external service may identify the object as a car or truck, or more specifically as a blue Toyota Prius™ depending on information stored in the shared vector space by the service and the relative location, size, and speed, of the vector cloud data, for example.

As represented at 642, the system or method may receive object history data from a remote server or service based on the vector cloud data identifying one or more objects. Objects have a history in the context of a particular location or scene. Historical object data may include object type, position, speed, timestamp, etc. For example, vehicles that are not moving will have a history of last movement time (timestamp) and may include a last speed or a maximum speed or velocity, for example. Historical data for an object received by the system or method may be used to assess mitigating strategies as to certain driving strategies in the situation, or determining the likelihood of a particular object entering the vehicle path based on the historical data. Similarly, blocked lanes, or objects in proximity to the road may have historical movement vectors indicating movement toward or away from the road or vehicle pathway. Such data can be added to the object vector as an overlay that is provided from an external service to the LiDAR sensor.

The system or method may receive data from an external service or server for objects outside of the FOV as represented at 644. Use of vector cloud data according to the present disclosure facilitates sharing of vector data by external services at high speed and low bandwidth to provide pre-detection information for objects that are outside the LiDAR sensor FOV. Such objects may be too far, too close, or otherwise obstructed from detection by the vehicle LiDAR sensor, but highly visible to sensors of other vehicles or otherwise known to the external service or server. Similarly, such objects can be approaching the vehicle from an angle that is difficult to detect, such as around a corner with an obstructed view, for example. Receiving object information from an external server or service may enhance operation in bad weather or low visibility conditions where sharing information between cars can be crucial for safe driving or maintaining high certainty (and higher speeds).

As represented at 646, the system or method may receive object data for otherwise undetected objects or unidentified objects within the FOV. An external server or service or other vehicles or road sensors may communicate object vector data to the vehicle LiDAR sensor for objects in the near area and inject these target symbols into the local vehicle point cloud images via the one or more controllers processing the data generated by the scanning LiDAR. Such vectors can be received from external road sensors and/or other vehicles in the area with various detection sensors. The enhanced or augmented point cloud including the injected targets can be used by perception and classification software of the LiDAR sensor to better detect and classify targets in all weather conditions.

As such, one or more of the representative embodiments of a system or method for a scanning LiDAR as described in detail above and illustrated in FIGS. 1-6 may provide a number of advantages. For example, the combination of solid-state fast scanning devices along one axis with slower mechanical scanning devices along an orthogonal axis may provide LiDAR scanning with better resolution and detection range at lower cost and power consumption relative to LiDAR relying entirely on solid-state switching devices. The combination of solid-state and mechanical scanning devices may provide improved reliability relative to systems having two mechanical mirrors with one of the mirrors operating with extreme speed and accuracy and subject to wear and tear over billions or trillions of cycles. Replacing the fast mirror scanning of such strategies with an optical switch, such as a Magneto Optic (MO) switch, may provide faster scanning rates capable of supporting 100 Hz or higher frame rates. Embodiments that include an optical switch architecture having cascaded layers or stages of optical switches to reduce the switching time of a large port count switch facilitate increased LiDAR frame rates with lower power consumption and overall switch cost. Generating a vector cloud based on changes in point cloud data resulting from the LiDAR scanning facilitates lossless compression of data for high-speed low-bandwidth storage and communication between vehicles and/or between the vehicle and an external server or service to provide sharing of detector information and enhanced detection of objects inside and outside of the field of view of the LiDAR sensor. Many other advantages may be recognized by those of ordinary skill in the art for particular applications and implementations based on this disclosure.

While representative embodiments are described above, it is not intended that these embodiments describe all possible forms of the claimed subject matter. The words used in the specification are words of description rather than limitation, and it is understood that various changes may be made without departing from the scope of the disclosure and claimed subject matter. Additionally, the features of various implementing embodiments may be combined to form further embodiments not explicitly described or illustrated, but within the scope of the disclosure and claimed subject matter and recognizable to one of ordinary skill in the art. Various embodiments may have been described as providing advantages or being preferred over other embodiments or prior art implementations with respect to one or more desired characteristics. As one of ordinary skill in the art is aware, one or more features or characteristics may be compromised to achieve desired overall system attributes, which may depend on the specific application and implementation. These attributes include, but are not limited to: cost, strength, durability, life cycle cost, marketability, appearance, packaging, size, serviceability, weight, manufacturability, ease of assembly, etc. Embodiments described as less desirable than other embodiments or prior art implementations with respect to one or more characteristics are not necessarily outside the scope of the disclosure and may be desirable for particular applications.

What is claimed is:

1. A scanning LiDAR system comprising:

a laser;

a first optical switch having an input configured to receive laser pulses from the laser and to redirect the laser pulses to a selected one of a plurality of outputs;

a first plurality of fibers each coupled to a different one of the plurality of outputs of the first optical switch;

a mirror configured to pivot or rotate in response to a control signal;

a first at least one optical element configured to receive the laser pulses from the first plurality of fibers and to redirect the laser pulses to the mirror;

at least one detector;

a second plurality of fibers having inputs configured to receive the laser pulses reflected from a field of view and outputs coupled to the at least one detector;

and at least one controller configured to control the first optical switch to direct the laser pulses from the input of the first optical switch to each of the plurality of outputs in turn, to generate the control signal to control the mirror to pivot or rotate to direct light from the first plurality of fibers to scan at least a portion of the field of view and direct reflected light from the field of view to the inputs of the second plurality of fibers, and to process signals from the at least one detector to generate data representing the at least a portion of the field of view.

2. The system of claim 1 wherein the first optical switch has no moving parts associated with switching light from the input to one of the plurality of outputs.

3. The system of claim 2 wherein the first optical switch comprises a magneto-optic switch.

4. The system of claim 2 wherein the first optical switch comprises:

a plurality of layers including at least an input layer with a first switching element and an output layer with a plurality of switching elements, each of the first switching element and the plurality of switching elements configured to optically switch light in sequence between a single input and a plurality of outputs in response to a control signal from the at least one controller, wherein the single input of the first switching element of the input layer comprises the input of the first optical switch, and the plurality of outputs of the switching elements of the output layer comprise the outputs of the first optical switch, each layer having the single input of each switching element in the layer connected to one of the plurality of outputs of an associated one of the switching elements in an adjacent layer, wherein the at least one controller is configured to operate the first switching element at a first switching speed and to operate the switching elements of each layer at a slower switching speed than the first switching speed.

5. The system of claim 1 wherein the at least one controller is configured to operate the switching elements of each layer at a switching speed between the first switching speed and an integer multiple of the first switching speed corresponding to an integer number of switching elements in the layer.

6. The system of claim 1 wherein the first switching element comprises an electro-optic switch.

7. The system of claim 1 wherein each of the plurality of switching elements comprises a magneto-optic switch.

8. The system of claim 4 further comprising a middle layer between the input layer and the output layer, wherein the input layer comprises a 1×2 electro-optic switch, the middle layer comprises two 1×4 magneto-optic switches, and the output layer comprises eight 1×4 magneto-optic switches.

9. The system of claim 1 wherein the mirror comprises a Galvanometric mirror, a rotating prism, a MEMS mirror, or a piezoelectric transducer (PZT) mirror.

10. The system of claim 1 wherein the first plurality of fibers is arranged in a linear array to scan a pixel column within the field of view and the mirror is controlled by the at least one controller to move the pixel column horizontally across the field of view, or the first plurality of fibers is arranged in a linear array to scan a pixel row within the field of view and the mirror is controlled by the at least one controller to move the pixel row vertically across the field of view.

11. The system of claim 1 wherein the at least one detector comprises a plurality of detectors each coupled to one of the outputs of the second plurality of fibers.

12. The system claim 11 wherein the plurality of detectors corresponds in number to the first plurality of fibers, and also to the second plurality of fibers.

13. The system of claim 11 wherein the first at least one optical element forms output beams from the laser pulses having an angular divergence along a first axis an integer multiple number of times greater than an angular divergence along a second axis perpendicular to the first axis, and wherein the second plurality of fibers includes the integer multiple times a number of fibers in the first plurality of fibers, and the integer multiple times the number of outputs of the first optical switch.

14. The system of claim 13 wherein the first at least one optical element comprises an aspherical lens, an anamorphic prism, or a cylindrical lens configured to form an output beam having an elliptical cross section.

15. The system of claim 1 wherein the laser comprises a fiber laser configured to generate pulses having a nominal wavelength between 900 nanometers (nm) and 1700 nanometers (nm).

16. The system of claim 1 wherein the first at least one optical element comprises a beam splitter configured to redirect the laser pulses to the mirror and to redirect the reflected light from the field of view to the inputs of the second plurality of fibers.

17. The system of claim 1 wherein the at least one detector comprises a first linear detector configured to detect near-infrared (NIR) light and a second linear detector configured to detect visible light, the system further comprising:

a dichroic beam splitter configured to receive reflected light from the field of view and to redirect received reflected NIR light from the second plurality of fibers to the first linear detector, and to redirect visible light from the second plurality of fibers to the second linear detector; and wherein the at least one controller includes a processor programmed to combine and overlay data from the first and second linear detectors to generate a combined image of the field of view.

18. The system of claim 1 wherein the at least one controller is further configured to control the first optical switch and the mirror in a hybrid scanning mode including a lower resolution that generates a first number of data points per area of the field of view within a first portion of a frame representing the field of view and a higher resolution mode that generates a second number of data points per area of the field of view within a second portion of the frame representing the field of view, wherein the second number of data points is higher than the first number of data points.

19. The system of claim 1 wherein the at least one controller is further configured to control the first optical switch and the mirror in at least a lower resolution first mode that generates a first number of data points within a frame representing the field of view at a first frame rate, and a higher resolution second mode that generates a second number of data points within the frame representing the field of view at a second frame rate, wherein the second number of data points is greater than the first number of data points and the second frame rate is less than the first frame rate.

20. The system of claim 19 wherein the first number of data points multiplied by the first frame rate is equal to the second number of data points multiplied by the second frame rate.

21. The system of claim 19 wherein the at least one controller is further configured to switch between the first and second modes and to combine the data generated by operation in the first and second modes to generate a single frame of the field of view.

22. The system of claim 19 wherein the at least one controller selects one of the first mode and the second mode in response to location of the system, ambient conditions, or identification of an object within the field of view.

23. The system of claim 1 wherein the at least one controller is further configured to control the first optical switch and the mirror to scan only a portion of the field of view.

24. The system of claim 1 wherein the at least one controller is further configured to process the data to identify an object, and wherein the portion of the field of view corresponds to the object.

25. The system of claim 1 wherein the at least one controller is configured to:

process the data generated by repeated scanning of the field of view to generate a point cloud; and determine a velocity vector including speed and direction for at least some of the point cloud to generate a corresponding vector cloud.

26. The system of claim 25 wherein the at least one controller identifies an object based on a cluster of vectors within the vector cloud having similar values differing by less than a predetermined tolerance value.

27. The system of claim 26 wherein the at least one controller identifies a plurality of related objects based on a plurality of vector clusters having similar values and categorizes the plurality of objects into one of a plurality of predetermined object types.

28. The system of claim 26 wherein the at least one controller is further configured to store or communicate an object type, object position relative to the field of view, and object vector for each of a plurality of objects within the field of view to provide a compressed representation of the field of view.

29. The system of claim 28 wherein the at least one controller is configured to communicate the object type, position, and vector to a remotely located computer server.

30. The system of claim 29 wherein the at least one controller is further configured to receive a certainty score from the remotely located computer server based on a comparison of the object type, position, and vector to a previously stored object type, position, and vector by the remotely located computer server.

31. The system of claim 29 wherein the at least one controller is further configured to receive object-related data previously stored by the remotely located computer server in response to the server identifying the object based on one or more of the communicated object type, position, and vector.

32. The system of claim 31 wherein the object-related data comprises object historical data.

33. The system of claim 32 wherein the object historical data includes at least one of movement timestamp, movement direction, speed, and location relative to the field of view.

34. The system of claim 1 wherein the at least one controller is further configured to receive vector data associated with at least one object that is outside the field of view.

35. The system of claim 1 wherein the at least one controller is further configured to receive vector data associated with at least one object that is within the field of view and to combine the received vector data with the generated data representing the at least a portion of the field of view.

36. A vehicle comprising a LiDAR system according to claim 1.

37. A method comprising scanning a field of view using a system according to claim 1.

38. A method comprising:

generating laser pulses;

optically switching the laser pulses received at an input to each of a plurality of outputs coupled to a corresponding first plurality of fibers arranged in a first linear array oriented along a first axis;

pivoting or rotating at least one mirror to redirect light from the first plurality of fibers along a second axis orthogonal to the first axis to illuminate at least a portion of a field of view;

directing light reflected from an object illuminated by at least some of the laser pulses via the at least one mirror through a second plurality of fibers arranged in a second linear array to at least one detector; and processing signals from the at least one detector to generate data representing the at least a portion of the field of view.

39. The method of claim 38 wherein optically switching comprises:

switching the laser pulses from the input of a first layer optical switch to a plurality of first layer outputs within a first switching time, each of the first layer outputs connected to a single input of one of a plurality of second layer optical switches; and for each of the second layer optical switches in turn, switching the laser pulses from the single input to one of a plurality of second layer outputs within a second switching time greater than the first switching time.

40. The method of claim 39 wherein a third layer of optical switches each includes a single input coupled to one of the plurality of second layer outputs, and a plurality of third layer outputs, the method further comprising:

for each of the third layer optical switches in turn, switching the laser pulses from the single input to one of the plurality of third layer outputs within a third switching time greater than the second switching time.

41. The method of claim 39 wherein the first layer optical switch comprises an electro-optic switch and the second layer optical switches comprise magneto-optic switches.

42. The method of claim 38 wherein pivoting or rotating at least one mirror comprises pivoting or rotating a Galvanometric mirror, a rotating prism, a MEMS mirror, or a mirror coupled to a piezoelectric transducer.

43. The method of claim 38 further comprising:

directing the laser pulses from the first plurality of fibers through a beam splitter to the at least one mirror; and directing the light reflected from an object illuminated by at least some of the laser pulses through the beam splitter to the second plurality of fibers.

44. The method of claim 43 wherein the at least one detector comprises at least a first detector and a second detector, the method further comprising:

directing a first portion of the light reflected from an object and having a first range of wavelengths to the first detector; and directing a second portion of the light reflected from an object and having a second range of wavelengths to the second detector.

45. The method of claim 44 wherein the first range of wavelengths includes visible wavelengths and the second range of wavelengths includes infrared wavelengths, and wherein directing the first and second portions of light comprises directing the light reflected from an object through a dichroic beam splitter.

46. The method of claim 38 further comprising optically switching the laser pulses and pivoting or rotating the at least one mirror to scan a first portion of the field of view with low resolution and a second portion of the field of view with high resolution.

47. The method of claim 38 further comprising:

optically switching the laser pulses and pivoting or rotating the at least one mirror to scan the field of view at a higher rate having a lower resolution during a first time period; and optically switching the laser pulses and pivoting or rotating the at least one mirror to scan the field of view at a lower rate having a higher resolution during a second time period.

48. The method of claim 47 wherein the data generated during the first time period includes the same number of data points as the data generated during the second time period.

49. The method of claim 47 further comprising combining data generated by scans at the higher rate and the lower rate to generate a single frame of data representing the field of view.

50. The method of claim 47 wherein the higher rate and the lower rate comprise frame rates.

51. The method of claim 38 further comprising:

processing the data to identify an object; and optically switching the laser pulses and pivoting or rotating the at least one mirror to scan the object with a different resolution than at least one other portion of the field of view.

52. The method of claim 38 further comprising:

processing the data generated by repeated scanning of the field of view to generate a point cloud; and determining a velocity vector including speed and direction for at least some of the point cloud to generate a corresponding vector cloud.

53. The method of claim 52 further comprising identifying an object within the field of view based on a cluster of vectors within the vector cloud having similar values differing by less than a predetermined tolerance value.

54. The method of claim 53 further comprising identifying a plurality of related objects based on a plurality of vector clusters having similar values and categorizing the plurality of objects into one of a plurality of predetermined object types.

55. The method of claim 53 further comprising storing or communicating an object type, object position relative to the field of view, and object vector for each of a plurality of objects within the field of view to provide a compressed representation of the field of view.

56. The method of claim 55 further comprising communicating the object type, position, and vector to a remotely located computer server.

57. The method of claim 56 further comprising receiving a certainty score from the remotely located computer server based on a comparison of the object type, position, and vector to a previously stored object type, position, and vector by the remotely located computer server.

58. The method of claim 55 further comprising receiving object-related data previously stored by the remotely located computer server in response to the server identifying the object based on one or more of the communicated object type, position, and vector.

59. The method of claim 58 wherein the object-related data comprises object historical data.

60. The method of claim 58 further comprising receiving object historical data including at least one of a movement timestamp, movement direction, speed, and location relative to the field of view.

61. The method of claim 38 further comprising receiving vector data associated with at least one object that is outside the field of view.

62. The method of claim 38 further comprising receiving vector data associated with at least one object that is within the field of view, and combining the received vector data with the generated data representing the at least a portion of the field of view.

* * * * *